Patented Aug. 27, 1935

2,012,569

UNITED STATES PATENT OFFICE 2,012,569

AMINODIPHENYL DERIVATIVES AND A PROCESS OF PREPARING THEM

Georg Kränzlein, Paul Ochwat, and Karl Moldaenke, Frankfort-on-the-Main, Germany, assignors to General Aniline Works, Inc., New York, N. Y., a corporation of Delaware No Drawing. Application June 18, 1932, Serial No. 618,088. In Germany June 24, 1931

6 Claims. (Cl. 260—109)

The present invention relates to aminodiphenyl derivatives and to a process of preparing them.

We have found that aminodiphenyl derivatives are obtainable in a yield which amounts to 70% of that of the theory by causing hydrocarbons of the benzene series to act upon N-halogen-acyl derivatives of amino compounds of the benzene series in the presence of metal halides having a condensing action, such as aluminium chloride, ferric chloride, and in the presence or absence of an indifferent organic diluent, while excluding moisture as completely as possible, and saponifying the reaction products obtained. Obviously, the reaction takes place in such a manner that at first the aluminium chloride is added, for example, to N-chloroacetanilide with formation of a hypothetical intermediate product and, thereupon, the acyl derivative of aminodiphenyl is formed with splitting off of aluminium chloride and hydrochloric acid, the said acyl derivative being converted into the free base by saponification.

The following scheme illustrates the course of reaction:

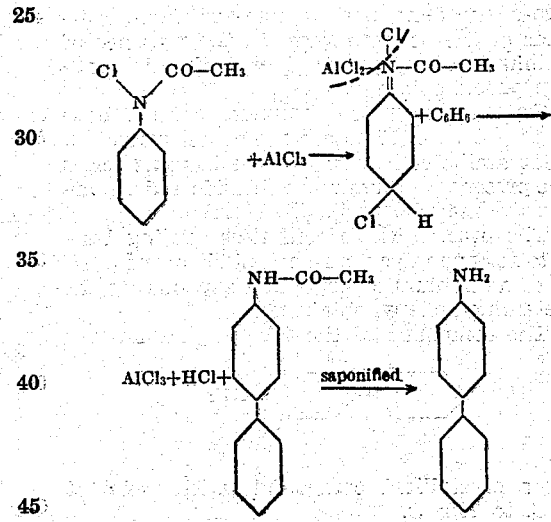

This course of reaction could not be foreseen, since it had to be expected that the halogen attached to the nitrogen atom would be exchanged for the hydrocarbon radical with the formation of a diphenylamine derivative.

The compounds obtained are valuable intermediate products, for instance, for the preparation of dyestuffs. Those among them, which are new products, are characterized by the following general formula:

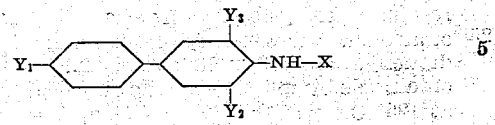

wherein $Y_1$ stands for hydrogen or halogen, $Y_2$ stands for carboxyl when $Y_1$ stands for hydrogen, and for alkyl when $Y_1$ stands for halogen, $Y_3$ stands for hydrogen or alkyl, and X stands for hydrogen or an acyl group.

The following examples serve to illustrate the invention, but they are not intended to limit it thereto, the parts being by weight:

(1) 17 parts of N-chloroacetanilide (cf. Beilstein, 4th edit., vol. XII, page 562) are dissolved in 50 parts of dry benzene and 30 parts of aluminium-chloride are added thereto, while cooling with ice. The whole is stirred for 3 hours at 0° C. to 5° C. and then at room temperature, until the evolution of hydrochloric acid gas has ceased. Thereupon, the reaction mixture is poured into water, the excess of benzene is removed by steam-distillation, the whole is cooled and filtered with suction. The reaction product, after being recrystallized once, melts at 169° C. to 170° C. and is identical with the known 4-acetaminodiphenyl. By saponification, it is converted into the known 4-aminodiphenyl.

By replacing in the preceding example 50 parts of benzene by about the equal quantity of chlorobenzene, there is obtained in an analogous manner the 4'-chloro-4-acetaminodiphenyl which, by saponification, is converted into 4'-chloro-4-aminodiphenyl, melting at 134° C.

(2) Into a suspension of 50 parts of aluminium-chloride in 150 parts of benzene, there is run at 0° C. to 5° C. a solution of 22.5 parts of N-chloroacetyl-o-toluidide (cf. Beilstein, 4th edit., vol. XII, page 829) in 100 parts of benzene. While excluding moisture, the whole is stirred for 5 hours, thereupon, it is poured into water and worked up as described in Example 1. Besides a small quantity of isomers, there is obtained in a very good yield 3-methyl-4-acetaminodiphenyl, melting at 158° C., which yields, when boiled with hydrochloric acid, 3-methyl-4-aminodiphenyl, melting at 43° C. By oxidizing 3-methyl-4-acetaminodiphenyl, for example, with permanganate in an alkaline solution, there is obtained 3-carboxy-4-acetaminodiphenyl, melting at 205° C. to 206° C. By splitting off the acetyl group, 3-carboxy-4-aminodiphenyl is obtained which melts at 200° C. to 202° C.

By replacing in this example N-chloroacetyl-o-toluidide by N-chloroacetyl-o-ethylanilide, there are obtained in an analogous manner 3-ethyl-4-acetaminodiphenyl and 3-ethyl-4-aminodiphenyl, respectively.

(3) By replacing in Example 2 the benzene by toluene, there is obtained 3,4'-dimethyl-4-acetaminodiphenyl, melting at 199° C. to 200° C., which, by saponification, is converted into 3,4'-dimethyl-4-aminodiphenyl, boiling at 205° C. to 207° C. under a pressure of 4 mm. hg.

(4) 60 parts of aluminium-chloride suspended in 150 parts of chlorobenzene are heated to 70° C., while excluding moisture as completely as possible. At this temperature, a solution of 36.7 parts of N-chloroacetyl-o-toluidide in 100 parts of chlorobenzene is introduced gradually so that the evolution of hydrochloric acid gas does not become too vigorous. After stirring for a short time, the whole is cooled, poured into water, the chlorobenzene is removed by steam-distillation and the residue is recrystallized from glacial acetic acid or alcohol. The 3-methyl-4-acetamino-4'-chlorodiphenyl obtained melts at 226° C.; its free base, obtainable by splitting off the acetyl-group, melts at 125° C.

By replacing in this example the chlorobenzene by about the equal quantity of bromobenzene, there are obtained in an analogous manner 3-methyl-4-acetamino-4'-bromodiphenyl and 3-methyl-4-amino-4'-bromodiphenyl, respectively.

(5) 21 parts of N-chlorobenzoyl-o-toluidide, obtainable according to known methods by causing a hypochlorite solution to act upon an aqueous suspension of benzoyl-o-toluidine in the presence of sodium bicarbonate, are dissolved in 80 parts of benzene and, at 40° C. to 45° C., this solution is run into a suspension prepared from 30 parts of aluminium-chloride and 100 parts of benzene. The whole is worked up as described in the preceding examples.

There is obtained 4-benzoylamino-3-methyldiphenyl, melting at 189° C. Its free base, obtainable by saponification, is identical with that obtained according to Example 2.

(6) 15 parts of aluminium-chloride and 14 parts of ferric chloride are heated to boiling in 100 parts of benzene and a solution of 18.5 parts of N-chloroacetyl-o-toluidide in 50 parts of benzene is added thereto. After working up, the same reaction product as that described in Example 2 is obtained.

(7) 30 parts of aluminium-chloride, 100 parts of tetrachloro-ethane and 9 parts of benzene are heated together to 45° C. to 50° C. At this temperature, there is added a solution of 19.7 parts of N-chloro-acetamino-2.6-dimethylbenzene (prepared by causing a hypochlorite solution to act upon 1-acetamino-2.6-dimethylbenzene, analogously to the preparation of N-chlorobenzoyl-o-toluidide as described in Example 5) in 50 parts of tetrachloro-ethane. The whole is heated for a short time at 70° C. to 75° C. and it is worked up as described in the preceding examples. There is obtained 3.5-dimethyl-4-acetaminodiphenyl, melting at 203° C. to 204° C., which, by saponification, may be converted into 3.5-dimethyl-4-aminodiphenyl.

(8) Into a mixture of 30 parts of aluminium-chloride and 150 parts of benzene, there is run at 75° C. to 78° C., while well stirring, a solution of 18.4 parts of N-chloro-propionyl-anilide in 250 parts of benzene. Stirring is continued at this temperature for about a quarter of an hour, whereupon the evolution of hydrochloric acid gas which takes place during the reaction, has ceased. The reaction mass is poured into water and the excess of benzene is removed by steam-distillation. The solid residue is recrystallized several times from alcohol. There are thus obtained brilliant, yellowish leaflets, melting at 182° C. to 183° C.

The compound formed has the following formula:

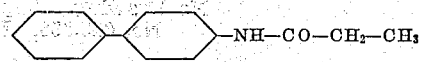

By splitting off the acyl-group by means of saponifying agents, the known 4-aminodiphenyl is obtained.

Instead of the N-halogen compounds of aromatic acetamino-, benzoylamino- or propionylamino-compounds, mentioned in the preceding examples, N-halogen compounds of other aromatic acylamino compounds, such as, for instance, those of the benzenesulfamino compounds, may be used.

We claim:

1. The process which comprises causing hydrocarbons of the benzene series to act upon N-halogen-acyl derivatives of nuclear amino compounds of the benzene series in the presence of metal halides having a condensing action and saponifying the reaction products obtained.

2. The process which comprises causing hydrocarbons of the benzene series to act upon N-chloro-acetyl derivatives of nuclear amino compounds of the benzene series in the presence of metal halides having a condensing action and saponifying the reaction products obtained.

3. The process which comprises causing hydrocarbons of the benzene series to act upon N-chloro-acetyl derivatives of nuclear amino compounds of the benzene series in the presence of aluminium chloride and saponifying the reaction products obtained.

4. The process which comprises causing benzene to act upon N-chloro-acetyl derivatives of nuclear amino compounds of the benzene series in the presence of aluminium chloride and saponifying the reaction products obtained.

5. The process which comprises causing benzene to act upon N-chloro-acetanilide in the presence of aluminium chloride and saponifying the 4-acetaminodiphenyl obtained.

6. The compound of the following formula:

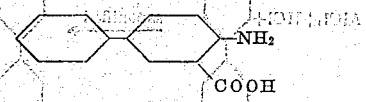

being a crystallized compound which melts at 200° C. to 202° C.

GEORG KRÄNZLEIN.
PAUL OCHWAT.
KARL MOLDAENKE.